US010318092B2

United States Patent
Aleksovski

(10) Patent No.: US 10,318,092 B2
(45) Date of Patent: Jun. 11, 2019

(54) MEDICAL RECORDS VISUALIZATION SYSTEM FOR DISPLAYING RELATED MEDICAL RECORDS IN CLUSTERS WITH MARKED INTERRELATIONSHIPS ON A TIME LINE

(71) Applicant: Koninklijke Philips Electronics N.V., Eindhoven (NL)

(72) Inventor: Zharko Aleksovski, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1030 days.

(21) Appl. No.: 13/786,524

(22) Filed: Mar. 6, 2013

(65) Prior Publication Data
US 2013/0246425 A1 Sep. 19, 2013

Related U.S. Application Data

(60) Provisional application No. 61/609,981, filed on Mar. 13, 2012.

(51) Int. Cl.
| | | |
|---|---|---|
| *G06F 3/048* | (2013.01) | |
| *G06F 3/0481* | (2013.01) | |
| *G06F 16/35* | (2019.01) | |
| *G06F 16/34* | (2019.01) | |

(52) U.S. Cl.
CPC ............ *G06F 3/0481* (2013.01); *G06F 16/34* (2019.01); *G06F 16/358* (2019.01)

(58) Field of Classification Search
CPC .................................................. G06F 3/0481
See application file for complete search history.

(56) References Cited

U.S. PATENT DOCUMENTS

| | | | |
|---|---|---|---|
| 5,598,557 A * | 1/1997 | Doner et al. | |
| 6,223,164 B1 * | 4/2001 | Seare | G06Q 40/02 705/2 |
| 6,611,846 B1 * | 8/2003 | Stoodley | G06F 19/322 705/3 |
| 6,985,898 B1 * | 1/2006 | Ripley et al. | |
| 7,149,729 B2 * | 12/2006 | Kaasten et al. | 707/754 |
| 7,162,488 B2 * | 1/2007 | DeVorchik et al. | |
| 8,015,136 B1 * | 9/2011 | Baker | G06F 19/322 706/45 |

(Continued)

OTHER PUBLICATIONS

Bui et al, "The Evolution of an Integrated Timeline for Oncology Patient Healthcare", Proc. AMIA Symp. 1998, pp. 165-169, PMID 9929203.

*Primary Examiner* — Ryan F Pitaro

(57) ABSTRACT

A document visualization system includes an extraction unit (1) for processing a first medical record (11) in a collection of medical records (10). The medical records include text (13) in a natural language. The extraction unit extracts an indicator from the text (13), which indicator is indicative of a reference to medical records (21) in the collection of medical records (10). A visualization unit (2) generates a visual representation of the first medical record (11), a visual representation of the second medical record (21), and a visual representation of the reference. A control unit (3) controls the extraction unit (1) to process a plurality of medical records of the collection of medical records (10), to extract indicators from text of the medical records.

10 Claims, 4 Drawing Sheets

(56) References Cited

U.S. PATENT DOCUMENTS

| | | | |
|---|---|---|---|
| 8,612,411 B1* | 12/2013 | Mittal | G06F 17/3071 707/706 |
| 8,782,044 B2* | 7/2014 | Kang | 707/736 |
| 8,788,289 B2* | 7/2014 | Flanagan | G06Q 10/10 705/2 |
| 2004/0049506 A1* | 3/2004 | Ghouri | G06F 19/326 |
| 2004/0056903 A1* | 3/2004 | Sakai | 345/853 |
| 2004/0098379 A1* | 5/2004 | Huang | 707/3 |
| 2004/0207666 A1* | 10/2004 | Hally et al. | 345/854 |
| 2006/0190817 A1* | 8/2006 | Banks | 715/526 |
| 2007/0027672 A1* | 2/2007 | Decary et al. | 704/7 |
| 2008/0208631 A1* | 8/2008 | Morita | G06Q 50/24 705/3 |
| 2008/0294459 A1* | 11/2008 | Angell | G06F 19/328 705/2 |
| 2009/0070380 A1* | 3/2009 | Schwager | G06Q 50/24 |
| 2009/0164255 A1* | 6/2009 | Menschik | G06F 19/322 705/3 |
| 2010/0115001 A1* | 5/2010 | Soules et al. | 707/821 |
| 2010/0160177 A1* | 6/2010 | Merbl | G01N 33/57484 506/9 |
| 2012/0065987 A1* | 3/2012 | Farooq et al. | 705/2 |
| 2012/0130741 A1* | 5/2012 | Sparandara | G06F 19/322 705/3 |
| 2012/0215559 A1* | 8/2012 | Flanagan | G06Q 10/10 705/3 |
| 2013/0124523 A1* | 5/2013 | Rogers | G06F 19/32 707/737 |
| 2013/0246425 A1* | 9/2013 | Aleksovski | 707/737 |
| 2013/0275153 A1* | 10/2013 | Dastmalchi | G06Q 50/24 705/3 |
| 2014/0046683 A1* | 2/2014 | Michelson | G06F 19/24 705/2 |
| 2015/0134594 A1* | 5/2015 | Sethumadhavan | G06F 19/322 707/602 |

* cited by examiner

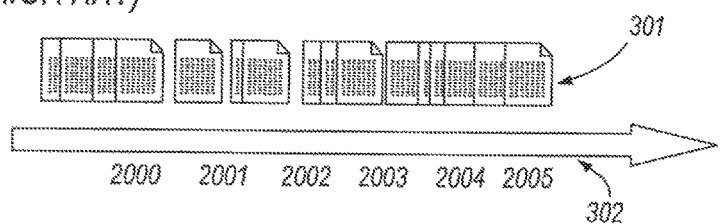
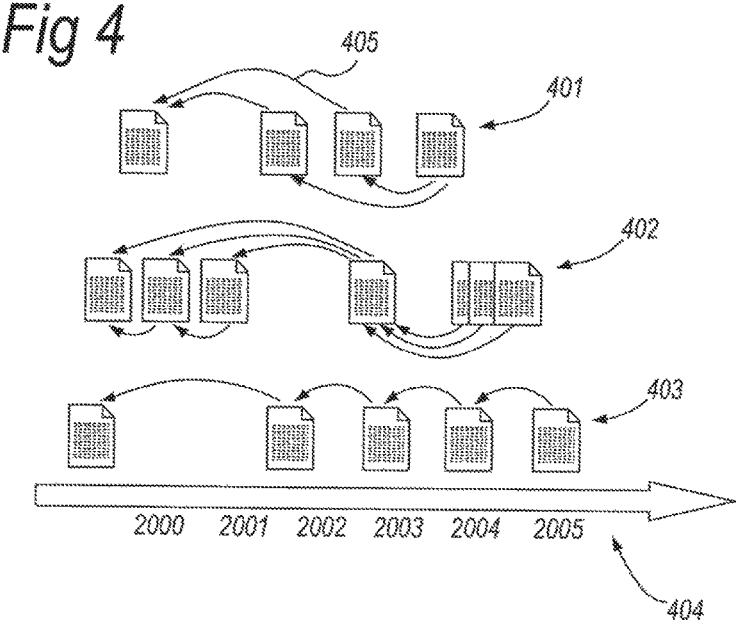

Fig 6

*Date: 09-Nov-2003* — 601

*Dear,*

*I request X-ray scan for possible breast cancer.*

*Cordially,*
*Dr.John Smith*

*Date: 12-Nov-2003* — 602

*To whom it may concern,*

*We performed the X-ray scan requested by Dr.Jhon Smith on 09-Nov-2003. There are two masses in the left breast, and microcalsification in the region around one of the masses, but there is no clear indication for breast cancer.*

*Cor dially,*
*Dr. Robert Brown*

Fig 7

*Date: 09-Nov-2003*

*Dear,*

*I request X-ray scan for possible breast cancer.*

*Cordially,*
*Dr.John Smith*

*Date: 12-Nov-2003*

*To whom it may concern,*

*We performed the X-ray scan requested by Dr.John Smith on 09-Nov-2003. There are two masses in the left breast, and microcalsification in the region around one of the masses, but there is no clear indication for breast cancer.*

*Cordially,*
*Dr. Robert Brown*

MEDICAL RECORDS VISUALIZATION SYSTEM FOR DISPLAYING RELATED MEDICAL RECORDS IN CLUSTERS WITH MARKED INTERRELATIONSHIPS ON A TIME LINE

FIELD OF THE INVENTION

The invention relates to a document visualization system.

BACKGROUND OF THE INVENTION

Patients visiting a hospital can have a multitude of medical conditions, which may be treated simultaneously or in different time periods. As a result, the medical record of a patient can grow in size and complexity, which makes it difficult for specialists to find information that is important for setting up a treatment plan. They have to go through the search process manually, and may not notice important information due to the overwhelming size of the patient file.

Existing document management systems are able to display the documents in a patient record by their date of creation or date of last change. Moreover, automatic generation of a timeline with icons representing documents generated, is known in the art. Also, sorting functionality may be provided, for example in alphabetical order according to the filename.

"The Evolution of an Integrated Timeline for Oncology Patient Healthcare", by A. A. T. Bui et al., Proc. AMIA Symp. 1998:165-9, PMID: 9929203, discloses an infrastructure for the creation of an integrated multimedia timeline that automatically combines patient information from distributed hospital information sources. Documents retrieved by a prefetch monitor are classified using schemes and data models to determine appropriate inclusion into document timelines. A document can appear in several document timelines if it matches different document categories. For example, a thoracic radiology report on lung cancer may appear in both a pulmonary document timeline and an oncology document timeline.

However, these existing document systems have a drawback in that it is not easy to find the right document from the document list or timeline. Also, information may be overlooked, because it is not clear which documents may contain important information.

SUMMARY OF THE INVENTION

It would be advantageous to have an improved document visualization system. To better address this concern, a first aspect of the invention provides a document visualization system comprising an extraction unit for processing a first document in a collection of documents, wherein the first document comprises text in a natural language, to extract an indicator comprised in the text, wherein the indicator is indicative of a reference to a second document in the collection of documents; and a visualization unit for generating a visualization comprising a visual representation of the first document, a visual representation of the second document, and a visual representation of the reference.

The reference from a first document to a second document reveals a relationship between the first document and the second document. By visualizing such a relationship, it becomes clearer which groups of documents exist in the collection of documents. In particular, sequences of events, such as intake, examination, diagnosis, treatment, and follow-up can be revealed without any assumptions about the topic addressed in the sequence of events. Because these documents typically reference one or more of the earlier documents, pairs of interrelated documents are disclosed by visualizing the reference from one document to another document.

The system may comprise a control unit for causing the extraction unit to process a plurality of documents of the collection of documents, to extract indicators from text portions of the documents, wherein the indicators are indicative of references to other documents. The visualization unit may be arranged for including visual representations of individual ones of the plurality of documents and visual representations of the references in the visualization. This allows to obtain an overview of relationships between documents. The system thus helps to generate a structure in a set of unstructured documents.

The system may comprise a clustering unit for clustering the documents, based on the indicators, to generate clusters of documents. The visualization unit may be arranged for providing a visual representation of at least one of the clusters of documents in the visualization. The visualization unit may also be arranged for providing a visual representation of more than one or of all clusters that were detected in the plurality of documents. Such a visualization of one or more clusters is helpful in finding relevant documents to fulfill a particular information need. The clusters of documents help the user to find the documents that are of importance, because documents that contain information relating to a particular question may be expected to be in the same cluster as another document that addresses that question. Consequently, it is easy to find the desired information without having to check each and every document in the collection of documents.

The system may comprise a concept determiner for determining at least one concept addressed in at least one of the documents in the collection of documents. The clustering unit may be arranged for performing the clustering also based on the concept. This provides an additional parameter that can be used to obtain better clustered documents. Moreover, a concept frequently used in a cluster of documents can be used to label that cluster of documents.

The system may comprise an interaction unit for enabling a user to interact with a document through a visual representation of the document in the visualization. This allows to provide easy access to a relevant document via the visualization. Examples of possible interaction include opening a document or generating a preview of the contents of a document or attaching a comment to a document.

The visualization unit may comprise a reference visualizing unit for visualizing the representation of the reference as a visual connection between the visual representation of the first document and the visual representation of the second document. This provides a good indication of the reference to a user. Such a visual connection may include a line or an arrow connecting the visual representations of the documents. Alternatively, the visual connection may be achieved by drawing the visual representations of the documents together in a box.

The extraction unit may be arranged for extracting a date and/or a person from the first document as the indicator. The system may further comprise a reference determiner for matching the date and/or the person with a date and/or a person that is associated with the second document. Such indicators are useful to resolve a reference to a document. The person may comprise an author of the referenced document or a person involved in creating the document; alternatively, the person may comprise a subject of the referenced document.

The reference determiner may be arranged for matching the date and/or the person with a structured data field of the second document. Although the indicator may be comprised in a natural language text portion, the referenced document may have the corresponding information stored as metadata. Consequently, it is helpful to match the extracted indicator with an appropriate structured data field of the referenced document.

The visualization unit may be arranged for arranging the visual representations of the documents on a timeline. This provides a further clue to the user and improves the structure of the visualization. The user can more easily identify relevant documents based on the documents and their connections on a timeline.

The visualization unit may be arranged for including an indication of a kind of the reference in the visualization. This helps to see in what way documents are interrelated.

In another aspect, the invention provides a workstation comprising the document visualization system set forth.

In another aspect, the invention provides a document visualization method.

The method comprises:

processing a first document in a collection of documents, wherein the first document comprises text in a natural language, to extract an indicator comprised in the text, wherein the indicator is indicative of a reference to a second document in the collection of documents; and generating a visualization comprising a visual representation of the first document, a visual representation of the second document, and a visual representation of the reference.

In another aspect, the invention provides a computer program product comprising instructions for causing a processor system to perform the method and/or implement the system set forth.

It will be appreciated by those skilled in the art that two or more of the above-mentioned embodiments, implementations, and/or aspects of the invention may be combined in any way deemed useful.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the drawings.

FIG. 3 is an example of a prior art timeline.

FIG. 4 is an example of a visualization of a collection of documents.

FIG. 6 shows two example text documents.

FIG. 7 shows relationships between the two example text documents.

DETAILED DESCRIPTION OF EMBODIMENTS

Figure 1:
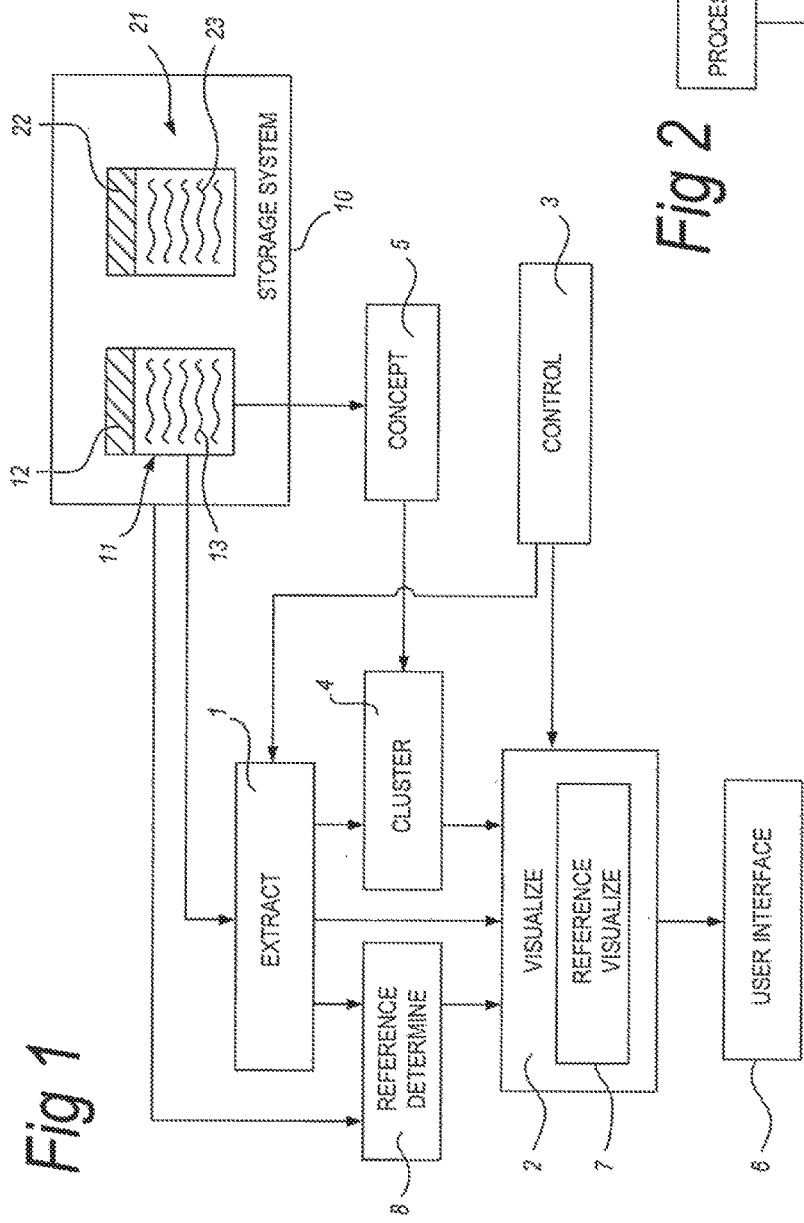
FIG. 1 is a block diagram of a document visualization system.

FIG. 1 illustrates a document visualization system. The system may be implemented on a distributed computer system, for example. Analyzing features may be implemented on a server system, whereas display features may be displayed by a client device with a monitor that a user can see. Other arrangements, including a standalone workstation, may also be used to implement the features described herein. Alternatively, the system and/or method described herein may be implemented using dedicated electronic circuitry. Although the system is described herein as comprising a number of units, it will be understood by the skilled person that the same functionality may be divided among a plurality of subroutines in a different manner.

The system may have access to a storage system that is capable of storing a collection of documents 10. This storage system may comprise a database system and/or a file system. For example, the storage system is part of a healthcare information system. The storage system 10 may be part of the document visualization system. Alternatively, the document visualization system may be connected to the storage system, for example via a network connection. The documents stored in the storage system and/or handled by the present document visualization system may comprise two kinds of data, namely structured data fields 12 and/or a portion containing free text 13. Such free text 13 could comprise the body of a medical report. In addition, a document may contain other kinds of data, such as image data or other kinds of measurement data, and structured data fields 12 may include a date of creation of the document, an author of the free text 13 portion, and more. Also, demographic data of the patient, such as date of birth, may be included in the structured data fields 12. Any number of documents may be present in the collection of documents 10. For the purpose of explanation, only two documents 11 and 21 have been drawn here. It can be seen that the other documents may also comprise a structured data portion 12, 22 and a free text portion 13, 23. However, not all documents necessarily contain all kinds of data. A document may comprise any single one, or any combination, of structured data, free text, image data, other measurement data, and any other kinds of data.

The document visualization system may comprise an extraction unit 1 for processing a first document 11 in a collection of documents 10. For example, this first document is selected randomly or semi-randomly from the collection of documents. The collection of documents may include documents that are present in a particular record, such as a patient record, in the database 10. In such a case, all the documents may relate to the same patient. Alternatively, the collection of documents comprises documents from a plurality of records, such as different patient records, so that the collection of documents relates to a plurality of patients. The first document 11 may comprise text 13 in a natural language. Although the first document 11 may also comprise structured data 12, this is optional.

The extraction unit 1 may be arranged for extracting an indicator comprised in the text 13, wherein the indicator is indicative of a reference to a second document 21 in the collection of documents 10. Such an indicator could be a description of certain identification information to identify the second document 21. Examples of identification information could include a date of creation of the second document, or a date of the treatment reported in the second document, an author of the second document, a treating physician or treatment reported in the second document, a type of the document, such as a diagnostic report, a test outcome, a medication prescription, a treatment report. A format of the document could also be described, such as a Microsoft Word® document or a Portable Document Format® document.

The system may further comprise a visualization unit 2 for generating a visualization. In this visualization, the documents may be visualized by means of a visual representation. Such a visual representation could include an icon, or any other kind of visual symbol. Alternatively, the visual representation could include a view of at least part of the contents of the document. For example, the visual representation could include a few lines of text of the document, or it could include a thumbnail visualization of a page of the document. Alternatively, the visual representation could include a full document viewer component, that would enable a user to browse the document. In particular, the visualization unit 2 may be arranged for generating a visualization that includes a visual representation of the first document 11, a visual representation of the second document 21, and a visual representation of the reference. The visualization of the reference could be done in many different ways. For example, an arrow could be drawn from the first document's visual representation to the second document's visual representation. Alternatively, a line could be drawn that connects the two visual representations. Yet alternatively, the two visual representations could be drawn together within an enclosing box. However, these are only non-limiting examples.

The system may comprise a control unit 3. This control unit 3 may be arranged to control the operation of one or more of the other units. For example, the control unit may be arranged for causing the extraction unit 1 to process a plurality of documents of the collection of documents 10. This processing of each document may be similar to the processing described hereinabove in respect of the "first" document. For example, the second document mentioned above may also be subjected to the same kind of processing, to find any references from the second document back to the first, or to any other documents in the collection of documents. The other documents in the collection of documents may also be subjected to this kind of processing, to extract indicators from text portions of the documents, wherein the indicators are indicative of references to other documents. This way, a data structure may be generated that represents how the documents are interrelated.

The visualization unit 2 may be arranged for including visual representations of individual documents 11, 21 of the plurality of documents 10 and visual representations of the references found in the visualization. This way, it is shown to the user how the documents are interrelated.

The system may comprise a clustering unit 4 for clustering the documents 11, 21 based on the indicators, to generate clusters of documents. Clustering algorithms are known in the art per se. For example, two documents may be regarded to be in the same cluster when there is a reference from one of the two documents to the other. Other kinds of clustering rules may also be defined. For example, it could be decided that a document belongs to a cluster if and only if it is linked with at least a predetermined number of documents in that cluster, wherein two documents could be considered to be linked if there is a reference from one document to the other. Other clustering methods are apparent to the skilled person in view of the present disclosure.

The visualization unit 2 may be arranged for providing a visual representation of at least one of the clusters of documents in the visualization. This way, a user can easily find all documents that are in a cluster of cross-referenced documents. Such a visual representation of a cluster could be generated by grouping together the documents making up a cluster, arranging the documents for a cluster closer to each other than to the documents of another cluster, and/or by drawing a line between visual representations of documents of different clusters. Alternatively, this could be visualized by visualizing visual representations of documents of only one cluster at a time. Other kinds of visualizations of clusters of documents will be apparent to the person skilled in the art in view of this disclosure.

The system may comprise a concept determiner 5 for determining at least one concept addressed in at least one of the documents 11 in the collection of documents 10. Such a concept could be determined by analyzing words in the free text 13. For example, words could be linked to concepts through an ontology, such as SNOMED. Alternatively, the words themselves may be regarded as the concepts. The clustering unit 4 may be arranged for performing the clustering also based on the concept. To this end, documents dealing with the same or a similar concept could be put in the same cluster. The clustering could be based on rules or algorithms that take into account both the references and the concepts. Alternatively, clustering could be based on either one of references and concepts.

The system may comprise an interaction unit 6 for enabling a user to interact with a document 11 through visual representation of the document in the visualization. Such interaction with a document through visual representation thereof could be similar to interaction with a document by means of its representative icon in the Windows operating system. Other kinds of interaction will be apparent to the skilled person, in view of the present disclosure.

The visualization unit 2 may comprise a reference visualizing unit 7 for visualizing the representation of the reference as a visual connection between the visual representation of the first document 11 and the visual representation of the second document 21.

The extraction unit 1 may be arranged for extracting a date and/or a person from the first document 11 as the indicator. The system may further comprise a reference determiner 8 for matching the date and/or the person with a date and/or a person that is associated with the second document 22. Other information may also be extracted and matched with data associated with the second document 22. The reference determiner 8 may be arranged for extracting the information from a text portion 23 of the second document. Alternatively, the reference determiner 8 may be arranged for matching the information with a structured data field 22 of the second document 21.

The visualization unit 2 may be arranged for arranging the visual representations of the documents on a timeline. For example, the visual representations may be arranged along the timeline, based on a date and/or time associated with the corresponding documents. Visual indications of the references may be included in these timeline representations, for example by means of connecting lines and/or arrows. Moreover, clusters may be visualized by means of different groups of visual representations along the same timeline. These visual representations for different clusters could be arranged along corresponding different lines that are parallel to the time axis of the timeline. Moreover, different clusters could be shown on different timelines.

The visualization unit 2 may also be arranged for including an indication of a kind of the reference in the visualization. For example, different kinds of references may be shown by means of a different color, a distinguishing icon, a text label, or in any other way. Examples of different kinds of reference may include follow-up, requested examination, and check-up. The system may extract these kinds of reference by means of analyzing structured data fields 21, 22, or by means of natural language processing of text portions 13, 23 of documents.

Figure 2:
FIG. 2 is a flowchart of a document visualization method.

FIG. 2 illustrates a document visualization method. In step 201 of the method, a first document in a collection of documents is processed. The first document comprises text in a natural language. An indicator comprised in the text is extracted, wherein the indicator is indicative of a reference to a second document in the collection of documents. In step 202 of the method, a visualization is generated. The visualization comprises a visual representation of the first document, a visual representation of the second document, and a visual representation of the reference. It will be understood by the person skilled in the art that the method may be extended and/or modified based on the functionality described herein in respect of the document visualization system. Moreover, the method and system may be implemented by means of a computer program product.

At least some of the methods and systems described herein may be used to automatically detect different treatment cycles of a patient, and present them as a flow of events visually on a timeline. The documents in the patient record which are part of a single treatment cycle may be related to one another through information such as dates, names of people and medical problems. FIG. 3 illustrates a hypothetical example of a collection of documents 301 in a patient record. This patient record contains 16 documents 301 (for the sake of explanation, but this number could in fact easily increase to 100 or more, especially when a patient is suffering from a complex disease such as cancer) and they are displayed on a timeline 302. Optionally, the documents may be colored differently—depending on the type of document (referral letter, radiology report, etc.)—however, that does not give the physician the necessary insight as to what treatments the patient has undergone. In the present example, the patient suffers from 3 different health issues: itching eye, broken ankle and breast cancer. This information is not visible on a classical timeline presentation of the documents, as illustrated in FIG. 3.

Using the techniques described herein, implicit connections between documents may be exploited to determine which documents belong to a single treatment. Each event in the course of treating a patient produces a document in her medical record. Each event in the medical history is triggered either by the patient—when she experiences a problem and visits a doctor, or by another doctor—when a doctor requests a further specialty analysis such as pathology or X-ray of her chest. Hence, the documents are naturally clustered in different treatments of the patient, and organized in a flow of events. In most of the existing electronic record systems, this information is only available in the patient's documents in form of free text, so the doctors have to open and read each document before they can grasp the patient's current situation. By virtue of the invention, the necessity to read through the documents every time they write a "medical history" section in each document for future reference can be dispensed with.

With the techniques described herein, a fully automated way is provided to find documents which belong to a single treatment, and then show them, for example, on a timeline as flows of events. Each document in the patient file contains the date of its creation. Furthermore, when a document is a follow-up—such as X-Ray exam requested by the GP—this document refers to the original document where this follow-up study was requested. References among documents can be made through the date of creation of the original document, the name of the physician who requested the follow-up study, or the problem which is to be studied further.

FIG. 4 illustrates an example output as generated by a system or method described herein. The system has recognized that the 16 documents are divided in three clusters, one for each treatment of the patient: first cluster 401 comprises documents relating to the issue of breast cancer, second cluster 402 relates to the broken ankle, and third cluster 403 relates to the itching eye. These clusters have been arranged along a timeline 404, although this is not a limitation. The system has classified the documents according to the problem they are about, and also shows how reports are interlinked through the arrows 405.

Figure 5:
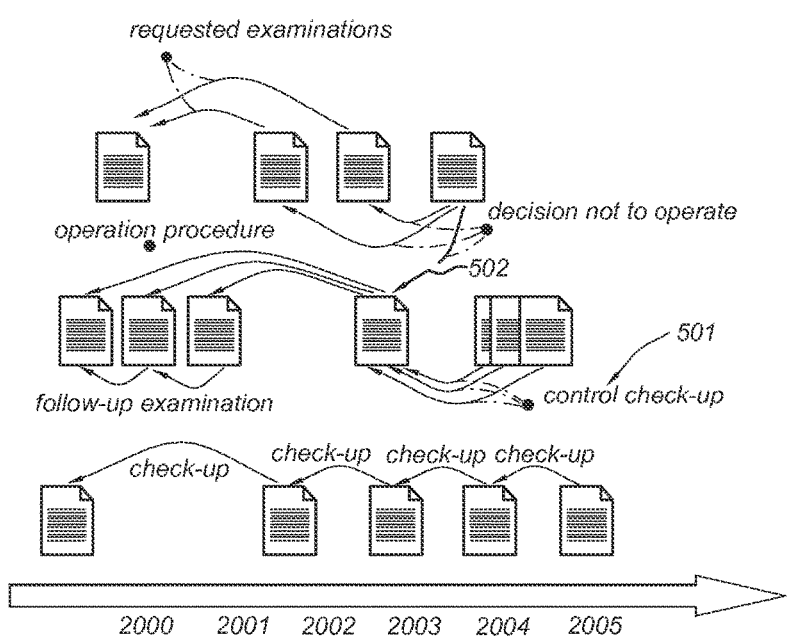
FIG. 5 is a further example of a visualization of a collection of documents.

FIG. 5 shows a further refinement of the visualization. The arrangements of the documents, clusters, arrows, and the timeline are identical to those of FIG. 4. However, labels 501 have been added to indicate the kind of reference. Indeed, the links between documents can be labeled using labels 501 according to the kind of connection between the documents. Such links can be for instance: requested examination, follow-up study, procedure performed based on, etc. Also, links can possibly be established among documents from different clusters (for example, different treatments). In FIG. 5, these two additional features have been implemented as well. The arrow 502 in the example interconnects documents from the breast cancer treatment 401 and the broken ankle treatment 402. There has been a decision not to subject the patient to a breast cancer operation because she has undergone a heavy operation on her ankle recently, and this connection is shown by means of an arrow 502 that interconnects documents from a different cluster.

Structuring and navigating (pulling the right documents in the shortest time possible) through the patient's record may be accomplished by using the techniques described herein. Doctors may get information about a patient which is otherwise hard and time-consuming to obtain. A system implementing the techniques described herein may also provide any one or more of the following information:

Which are the different treatments that the patient has undergone

Chronology of each treatment—the number of examinations, when did most activity in this treatment occur, which periods of the treatment were without clinical activity, etc.

Time-span of each treatment, in which time period did the treatment occur, and how different treatments overlap with one another Complexity of each treatment—the number of documents and the connections among them indicate the complexity of the treatment Different patient treatments may be detected as sets of documents from the patient's medical history. It may also be detected how events within a single treatment relate, that is which document was triggered by which event. Moreover, treatments may be displayed as flows of events, for example on a timeline.

Dates, doctor's names, and medical problems may be detected in the documents, and may be used to link documents. However, the invention is not limited to these three kinds of information. Other entities may be used to find connections among the documents as well.

A document may be associated with a date when it was created, and this information may be available in machine readable form rather than as free text. However, the reference to such a document is usually represented by a date written in a natural language form. These dates can be extracted from the natural language text. Dates are written in various formats throughout free text. Such different formats of the same date are for example: 2003 Nov. 9, 2003 Nov. 9, 2003 Nov. 9, Sunday, 9 Nov. 2003, and so on. To recognize the different formats, the modern programming languages have dedicated classes to detect when there is a date in free text, as well as to read which date it is. So, using these classes, a system may be built that recognizes dates in free text. Then it becomes possible to find connections through dates: when a date is found in the text of document A, and it is the same as the date of creation of document B, then the document A may refer to the document B. It is also possible to verify this by analyzing further information about the referenced document. Such further information may include a doctor who was mentioned in the referenced document.

Doctors typically write their name in each document they produce, for example at the end. In such a case, it is possible by reading the end of the document to get the name of the doctor who wrote it. In some cases documents have a special field for the name of the doctor who wrote the document.

So, the system may take the names of all the doctors who wrote the documents in the patient's file, search the texts of all the documents for occurrences of these names, and when one of the names is found in some text, then that is a reference to a document written by this person. If this person wrote multiple documents, dates can be used for additional security to find the right reference.

Modern medical ontologies, such as ICD10 or SNOMED-CT, offer comprehensive lists of medical problems. By simply searching for the problems listed in these ontologies throughout the documents in a patient file, it is possible to obtain the medical problems that this patient has been dealing with. Comparing the problems found in different documents can show how the documents are related to one another.

FIGS. 6 and 7 illustrate three different types of information extracted from a document, that can be used to resolve a reference from one document to another document. FIG. 6 shows the two documents 601 and 602 in their original form.

The two documents are highly related to one another—the one on the right 602 is a follow-up of the one on the left 601. But this information is not available to a doctor who looks at a plain list of documents. Using a system as described herein, the relevant indicators may be extracted from the follow-up document 602, and the reference to the original document 601 may be resolved. The system first extracts the indicators "Dr. John Smith", "9 Nov. 2003", and/or "breast cancer". Then, it looks up corresponding information in other documents, including document 601. In the document 601, the system finds corresponding information of the person who wrote the document "Dr. John Smith", letter date "9 Nov. 2003", and "breast cancer", as indicated by means of the arrows in FIG. 7. Accordingly, the system will establish that document 602 refers to document 601, and will show an indication 405 of this reference when generating the visualization.

It is noted that the algorithms used to find dates, names and medical problems can be enhanced to recognize various similar forms.

The techniques described herein may be applicable across and beyond all clinical information systems areas. Any medical system that allows some form of interaction with the whole or part of a patient record may provide additional benefits by implementing the techniques disclosed herein. Moreover, non-medical information systems may also benefit from these techniques.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A medical records visualization system comprising:
a medical records database which stores medical records of a plurality of patients relating to a plurality of medical conditions, the medical records including natural language text;
an electronic processing system including:
an extraction unit for processing a first medical record in the medical records database to extract an indicator from the natural language text of the first medical record, wherein the indicator is indicative of a reference to a second medical record in the medical record database, wherein the indicator includes a date and a patient identifier associated with the first medical record,
a control unit for causing the extraction unit to process a plurality of the medical records of the medical records database to extract indicators from the natural language text of the medical records, wherein the indicators are indicative of references to other medical records and include a date and a patient identifier in the natural language text of the second medical record,
a reference determiner for matching the date and/or the patient identifier in the natural language text of the first medical record with the date and/or patient identifier associated with the second medical record and/or a structured data field of the second medical record,
a concept determiner for determining at least one concept addressed in the matched medical records, the concept including a medical condition,
a clustering unit for clustering the medical records based on the indicators, the concepts, and the patient identifier to generate clusters of medical records relating to a common medical condition of the identified patient wherein each of the clustered medical records references at least one other of the clustered medical records, and
a visualization unit for generating a visualization comprising (a) a visual representation of the first medical record, the second medical record, additional medical records, the visualized medical records being arranged in the clusters, (b) lines or arrows linking the visualized medical records of each cluster that reference each other, and (c) a timeline.

2. The system according to claim 1, further comprising:
an interaction unit for enabling a user to interact with a selected medical record through the visual representation of the medical record in the visualization.

3. A medical records visualization method comprising:
with one or more processors, processing a first medical record in a collection of medical records stored in one or more database memories, wherein the first medical record comprises text in a natural language, and one or more of image data, measurement data, data creation, author, a patient identification, and demographic data of the patient to extract an indicator, wherein the indicator is indicative of a reference to a second medical record in the collection of medical records;
with the one or more processors, processing the medical records of the collection to extract indicators of other medical records in the collection;
with the one or more processors, matching the extracted indicators to identify medical records of a selected patient relating to a selected concept or medical condition and for extracting the dates;
with the one or more processors, clustering the medical records based on the indicators including the concepts and the patient identification to generate a cluster of medical records relating to a common concept of the selected patient;
with the one or more processors, controlling a display device to generate a visualization including medical records of the selected patient arranged in clusters by concept and disposed along a timeline by date, with arrows or lines linking visualized medical records of the cluster that reference each other.

4. A non-transitory computer-readable medium comprising instructions for causing a processor system to perform the method according to claim 3.

5. A healthcare information system comprising:
one or more medical records database which store medical records of a plurality of patients, the medical records including free text, image data, measurement data, dates of creation, author identifications, patient identifications, and demographic data of the patients;
a display device configured to display medical records from the one or more medical record databases; and
a processor system configured to:
process a first medical record in the one or more medical records database to extract an indicator, wherein the indicator is indicative of a reference to a second medical record in the collection of medical records;
process the second medical record to extract indicators of other medical records in the one or more medical records databases;
match the extracted indicators to identify medical records of a selected patient relating to a medical condition and for extracting the dates;
cluster the medical records based on the indicators including the medical conditions and the patient identification to generate a cluster of medical records relating to a common medical condition of an identified patient;
control the display device to generate a visualization including medical records of the identified patient arranged in clusters by medical condition and disposed along a timeline by date, with arrows or lines linking visualized medical records of the cluster that reference each other.

6. The healthcare information system according to claim 5, wherein the processor system is arranged to cluster the medical records by:
determining if each medical record references a predetermined plural number of documents in a given cluster;
if one of the medical records references the predetermined number of medical records in a the given cluster, putting the document in the given cluster.

7. The healthcare information system according to claim 5, wherein the processor system is configured to control the display device to:
group the medical records in each of a plurality of clusters along parallel time lines.

8. The healthcare information system according to claim 5, wherein the processor system is configured to:
find medical records which belong to a single treatment;
show the found medical records as a flow of events.

9. The healthcare information system according to claim 5, wherein the processor system is further configured to:
compare medical conditions listed in a medical ontology with the medical records to obtain the medical conditions with which the patient is dealing.

10. The medical records visualization system according to claim 1, wherein the extraction unit further processes the medical records in the database to identify medical records belonging to the common medical condition of one of the clusters, and the clustering unit further clusters the identified medical records belonging to the common medical condition in the one of the clusters.

\* \* \* \* \*